United States Patent [19]

Bos

[11] 4,411,139
[45] Oct. 25, 1983

[54] DEFROST CONTROL SYSTEM AND DISPLAY PANEL

[75] Inventor: Peter J. Bos, Manitowoc, Wis.

[73] Assignee: AMF Incorporated, White Plains, N.Y.

[21] Appl. No.: 252,668

[22] Filed: Apr. 9, 1981

[51] Int. Cl.³ .................. F25B 49/00; F25D 21/06
[52] U.S. Cl. ........................... 62/126; 62/127; 62/155; 62/234
[58] Field of Search .............. 62/234, 127, 126, 157, 62/155, 231, 125, 128; 236/46 R, 94; 165/12, 11, 22; 340/309.4, 309.5; 364/144, 185, 189

[56] References Cited

U.S. PATENT DOCUMENTS

| | | | |
|---|---|---|---|
| 4,071,745 | 1/1978 | Hall | 165/11 |
| 4,151,723 | 5/1979 | Gardner | 62/234 |
| 4,204,196 | 5/1980 | Sveda | 340/309.4 |
| 4,279,012 | 7/1981 | Beckedorff et al. | 340/309.4 |
| 4,284,126 | 8/1981 | Dawson | 165/22 |
| 4,298,163 | 11/1981 | Richardson et al. | 236/47 |
| 4,319,319 | 3/1982 | Wygant | 340/309.4 |

Primary Examiner—Albert J. Makay
Assistant Examiner—Harry Tanner
Attorney, Agent, or Firm—David E. Dougherty

[57] ABSTRACT

A defrost control system is provided for initiating one or more (defrost) timing cycles each at a preselected different time and for terminating the cycles at the end of their respective predetermined (defrost) periods. The unit generally includes a solid-state, microprocessor based, programmable twenty-four hour timer, and a display panel having an electrooptical digital time display and two sets of defrost status/program indicators. The two sets of defrost indicators are separately or concurrently activated to visually present a display indicative of a plurality of program and operating status events, for example, the occurrence of an automatic or manual defrost initiation.

8 Claims, 6 Drawing Figures

DEFROST CONTROL SYSTEM AND DISPLAY PANEL

BACKGROUND OF THE INVENTION

This invention relates to defrost controls for one or a plurality of refrigeration units and, more particularly, to a solid state defrost control system having expanded data storage and display capabilities.

DESCRIPTION OF THE PRIOR ART

It is generally recognized that an accumulation of frost on the coils of a refrigerating system is detrimental to the efficient operation and this is particularly significant in large commercial applications where economy of operation is of major importance.

Defrost controllers for one or a plurality of refrigeration units are known in the art for defrosting at regular timed intervals.

Heretofore, electromechanical timers for controlling multiple circuits have included a plurality of timers mounted in a common frame and coupled to each other. These timers typically included timing dials provided with actuator means thereon for tripping a spring biased pivot lever into or out of engagement with a switch means which initiates or terminates the desired timing cycle.

One problem encountered in the prior art electromechanical defrost controllers was the possibility of a (manually initialed) irregular and/or abridged defrost cycle and/or the preempting of a programmed defrost cycle as a result of such manual initiation.

Multi-circuit timers of the prior art have also failed to provide adequate versatility and accuracy in the control of large numbers of refrigeration units, and fail to provide a readily readable monitor for providing feedback information relative to the defrost control of the refrigeration units.

PRIOR ART STATEMENT

The folowing patents represent some of the prior art pertinent to the field of defrost timers for refrigeration units: U.S. Pat. Nos. 2,687,620 issued Aug. 31, 1954 to R. G. Raney; 2,614,395 issued Oct. 21, 1952 to H. S. King; 3,759,049 issued Sept. 18, 1973 to C. A. Bell; 3,830,993 issued Aug. 20, 1974 to K. J. Schulze-Berge; 3,854,915 issued Dec. 17, 1974 to K. J. Schulze-Berge et al; 4,056,948 issued Nov. 8, 1977 to C. J. Goodhouse; 4,251,988 issued Feb. 24, 1981 to J. J. Allard and R. A. Heinzen; 3,903,515 to Haydon et al; 4,151,723 to Gardner; 4,001,557 to Stephenson; 4,152,902 to Lush; 4,200,910 to Hall and 4,209,994 to Mueller et al.

The above noted patents are incorporated into the disclosure of the present invention to the extent necessary.

The above noted patents are mentioned as being representative of the prior art and other pertinent references may exist. None of the above noted patents are deemed to affect the patentability of the present claimed invention.

In contrast to the prior art devices, the present invention provides a generally solid state, microprocessor controlled, programmable defrost timer; and a display panel having an electrooptical digital time display and at least two sets of defrost data/program indicators which are separately or concurrently activated to provide feedback information for improved control and monitoring of the refrigeration units.

SUMMARY OF THE INVENTION

Generally speaking, in accordance with the invention, a central defrost control system is provided for defrost sequencing one or more commercial refrigeration units comprising:
  a central processing means;
  a program/function control means;
  a plurality of defrost control output means; and
  a display means having a plurality of discrete indicators separately or concurrently activatable for indicating a programmed defrost cycle, and/or a manually initiated defrost cycle, and/or a refrigeration unit shut-down while in defrost, and/or a remote defrost termination, and/or a power loss.

Accordingly, an object of the invention is to provide a new and improved central defrost controller.

Another object of the invention is to provide a generally solid state defrost controller for defrost sequencing a plurality of commercial refrigeration units.

A further object of the invention is to provide a new and novel defrost control system having a display for readily indicating the program/manual defrost status of a refrigeration unit.

Another object of the invention is to provide a defrost control system having a new and novel display for indicating a refrigeration unit shut-down while in a defrost cycle.

A further object of the invention is to provide a defrost control system having a new and novel display for indicating a defrost cycle termination effected local to the monitored refrigeration unit.

Another object of the invention is to provide a defrost control system having a new and novel display for indicating the occurrence of a power loss or brown-out condition.

Another object of the invention is to provide a defrost control module having display means to provide visual feedback to the user of both the programmed and/or status information for each refrigeration unit.

Another object of the invention is to provide a time reference display which will flash indicia thereon as an indication of an experienced power interruption by the control unit.

Another object of the invention is to provide a flashing indicia to indicate a manually initiated defrost.

Yet another object of the invention is to provide an automatic programmable defrost timer system having display means to enable user review of programmed defrost period(s), for example, over a twenty-four hour period without disturbing the status of the outputs to the refrigeration units.

BRIEF DESCRIPTION OF THE DRAWINGS

Other objects and advantages of the invention may be more clearly seen when viewed in conjunction with the accompany drawings.

DETAILED DESCRIPTION OF THE DRAWINGS

With reference to the drawings, the present invention, in basic terms comprises a programmable generally solid state central control system for defrost sequencing a plurality of commercial refrigeration units, and has a display panel for providing visual feedback information indicative of the programmed and current defrost status of the monitored refrigeration units.

Figure 1:
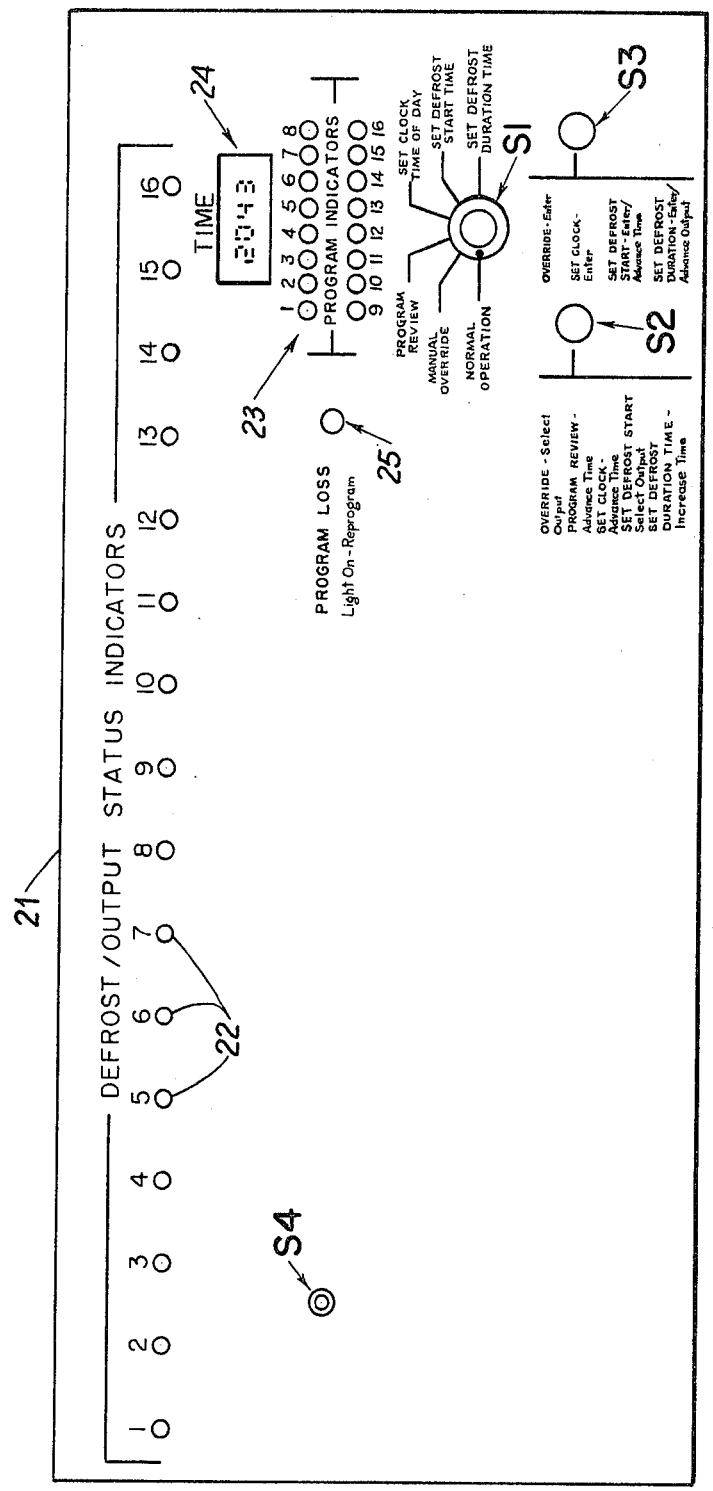
FIG. 1 is a perspective representation of the display panel for the defrost control system in accordance with the present invention.
Figure 2:
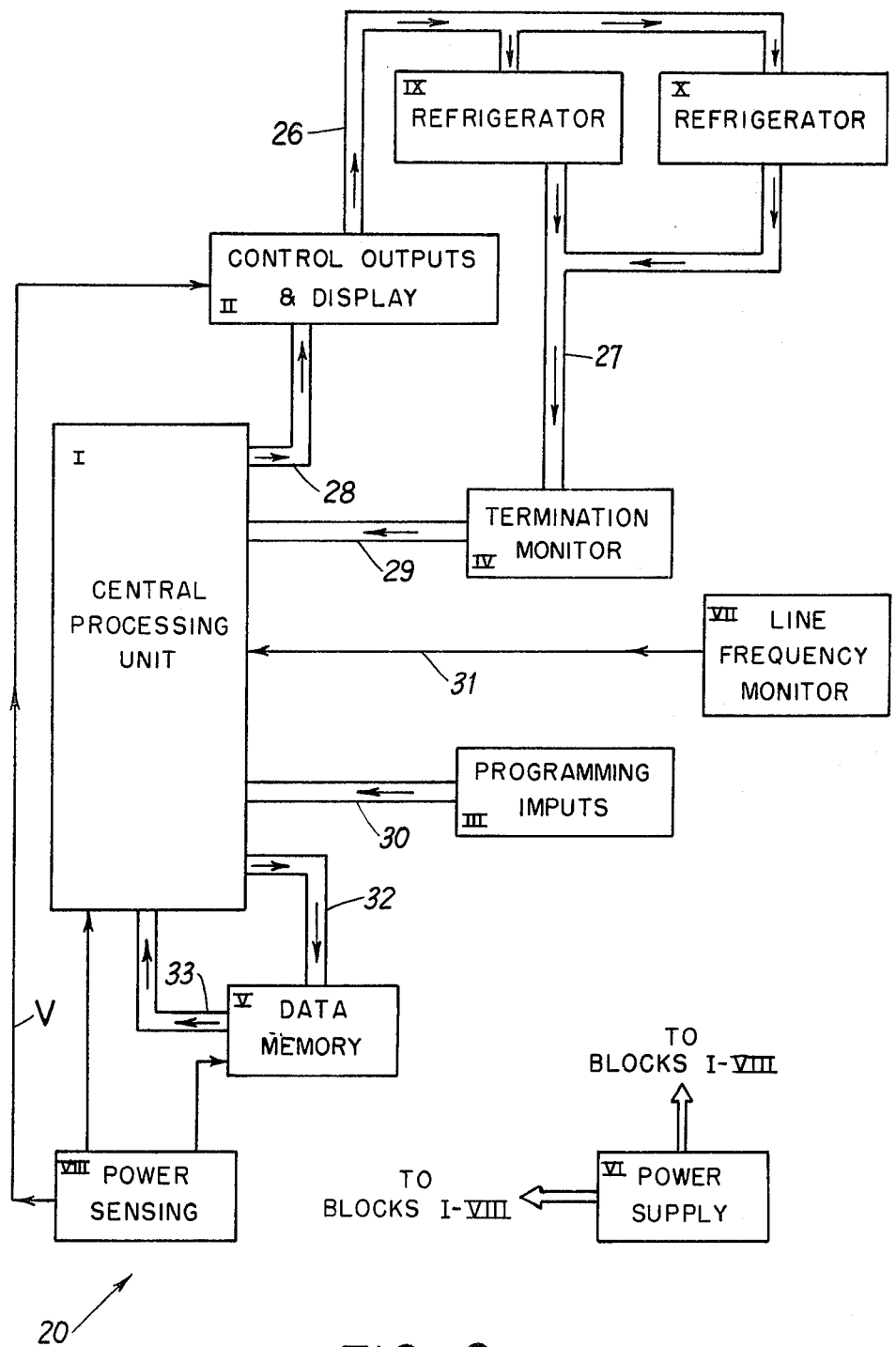
FIG. 2 is a general block diagram of the circuit logic employed in the preferred embodiment of the invention.

With reference to FIGS. 1 and 2, the basic functions and features of the central defrost control system 20 in accordance with the present invention, will now be described. The display panel 21 generally comprises a first set 22 of defrost/output status indicators, a second set 23 of program indicators, a solid state digital time reference display 24, a mode select switch S1, an advance switch S2, a data enter switch S3, a memory clear switch S4, and a program loss indicator alarm 25.

Each set of indicators 22 and 23 contains sixteen (16) separately energizable indicia, for example, lamp or light emitting diode (LED) devices. Each set 22, 23 of indicators is respectively numbered 1-16, with each correspondingly designated indicator, e.g., output/-status and program indicators designated number 1, being indicative of the program/status of a respective one of a possible sixteen (16) individually monitored/-defrost controlled refrigeration units, e.g., unit X.

The mode selector switch S1 comprises a multi-position rotary switch for selectively placing the central defrost control system 20 is one of six mode positions. The modes of operation indicated on the front panel 21 are: (1) Normal Operation, (2) Manual Override, (3) Program Review, (4) Set Clock Time of Day, (5) Set Defrost Start Time, and (6) Set Defrost Duration Time.

The advance switch S2 comprises, for example, a pushbutton switch, which when actuated in cooperation with the mode selector switch S1 being in the manual override position will initiate a defrost cycle of the selected refrigeration unit. A printed list of the functions effected by the advance switch S2 corresponding to each mode selector switch S1 position is provided on the front panel 21. Thus, in tabular form, juxtaposed to the advance switch S2 are the following designated functions: Override-Select Output; Program Review-Advance Time; Set Clock-Advance Time; Set Defrost-Select Output; Set Defrost Duration Time-Increase Time.

The data enter switch S3 comprises, for example, a pushbutton switch, which when actuated with the mode selector switch S1 being properly mode selected, will enable data entry into the program of the selected-/addressed program corresponding to a respective refrigeration unit or to toggle the defrost control output state with the mode selector switch S1 in the Manual Override position. In tabular form juxtaposed to the data enter switch S3 is a printed listing of the functions effected by data enter switch S3 in cooperation with mode selector switch S1. The listed functional features of the data enter switch S3 are: Override-Enter; Set Clock-Enter; Set Defrost Start-Enter/Advance Time; Set Defrost Duration-Enter/Advance Output.

The time reference display 24 basically comprises a digital electrooptical display capable of displaying thereon unit minutes, tens of minutes, unit hours, tens of hours, and a decimal interposed between the tens of minutes digit and the unit hours digit. Each digit comprises, for example, seven discrete segments arranged in a figure eight pattern. Each of the seven segments is selectively actuated to form the numbers 0-9 for each of the digits. Driving circuitry suitable for actuation of digital display timepieces are known in the field, such as is described in U.S. Pat. No. 3,333,410 issued Aug. 1, 1967 to A. N. Barbella and U.S. Pat. No. 3,579,976 issued May 25, 1971 to T. F. D-Muhala.

An alarm indicator 25 is provided on the front panel 21 to visually display to the operator that a program loss has occurred and, therefore, reprogramming is required.

Another feature which is provided on the front panel 21 is a memory clear switch S4 to enable the operator to selectively clear the programmed memory. This switch S4 may comprise any conventional switch such as a pushbutton switch.

The control and feedback/monitoring features provided on the front panel 21 of the defrost control system 20 will now be discussed for each of the mode selector switch S1 positions.

With the mode selector switch S1 in the Normal Operation mode, the time reference display 24 is activated to illustrate the cycle reference time, for example, 20 hours and 43 minutes, of a predetermined time period such as a twenty-four hour day. A blinking or flashing decimal between the unit hours digit and tens of minutes digit is indicative of the Normal Operation mode. It should be recognized, that the acutation of switches S2 and S3 will have no effect with the mode selector switch S1 disposed to the Normal Operation mode position. While in the Normal Operation or run mode, the defrost control system 20 sequentially interrogates each of the refrigeration units IX, X associated program and, if program directed, provides a signal/circuit path to the respective refrigeration unit to initiate a (programmed) defrost cycle. As will be more fully discussed hereafter, the duration of the defrost cycle may be programmed controlled and/or constrained by a manual end defrost signal. During each defrost cycle, the respective defrost/ouput status indicator corresponding to the defrosting refrigeration unit will be energized to provide a visual indication that a defrost of that refrigeration unit is being conducted. A manual override initiated defrost cycle will be indicated by a blinking program indicator for the respective refrigeration unit being defrosted. While in the Normal Operation (run) mode, a blinking time reference display will indicate a power interruption and/or loss of time synchronization.

With the mode selector switch S1 rotated to the Manual Override position, the time reference display 24 is frozen or held to depict the reference time when Manual Override was selected. The defrost/output status indicators 22 will display the programmed on/off defrost output status of control unit 20 for each respective refrigeration unit. The program indicators 23 are momentarily blanked and then output/program number 1 is addressed, turning-on program indicator number 1, i.e., energizing to illuminance, to provide an indication as to which output is under manual control. Pressing the enter switch S3 while in the Manual Override mode will cause the ouput defrost control state indicated by the respective status indicator to toggle in its control state.

For example, if status indicator number 1 and, therefore, defrost control output K1 (see FIG. 4) were off, i.e., not in a program control defrost cycle, pressing the enter switch S3 while in Manual Override mode will turn-on status indicator No. 1 and manually initiate a defrost cycle, to effect defrosting of the respective refrigeration unit. However, if the K1 output and status indicator No. 1 were on, i.e., in a programmed defrost status, they will turn-off with an actuation of the enter switch S3 while in the Manual Override mode to effect termination of the programmed defrosting of the respective refrigeration unit. It should be noted that manual initiation of a defrost cycle in this manner will effect a defrosting for a predetermined duration from the point in time at which the manual defrost override was actuated. Any occurrence of a programmed defrost initiate will be honored while in this mode if prior to selector switch S1 entry to the Manual Override mode the control unit 20 was not in one of the program modification modes, i.e., the Set Clock Time Of Day mode, or the Set Defrost Time mode, or the Set Defrost Duration Time mode.

With the mode selector switch S1 now turned to the program review mode, the time reference display 24 and status indicators 22 will function in a similar manner as if the control unit 20 was in the Normal Operation mode except that the display decimal will be caused not to flicker. If the advance pushbutton switch S2 is held depressed, i.e., actuated, the time reference display will advance at a rate of 4 minutes per second. And each of the discrete program indicators 23 will be sequentially energized starting from the displayed reference time at which the program review advance pushbutton switch S2 was depressed by the operator. Also each correspondingly designated program indicator will coincidently turn on/off to indicate the future defrost time/duration programmed event for the respective defrost control outputs. Thus, in this manner a review may be made to determine the output defrost overlap periods and the next scheduled defrost periods. Pressing the data enter switch S3 while in this mode has no effect and the occurrence of a programmed defrost initiation will be honored if prior to entry to this mode the control had not been in a program modification mode.

With the mode selector switch S1 turned to the Set Clock Time Of Day mode, the reference time being displayed by display 24 is held or frozen and the program indicators 23 are blanked out, i.e., deenergized. Momentarily pressing the advance (pushbutton) switch S2 will increment the time being displayed, and if held depressed will cause the display to ripple increment at a rate of 4 minutes per second. Upon incrementing from 59 minutes to 00 the minutes digits will be frozen at 00 and the hour digits will ripple increment at a rate of 2 hours per second. When the desired hour is reached the button is released. Depressing pushbutton switch S2 again will cause the minutes to again be incremented. Upon reaching the desired time reference, depressing the enter switch S3 will update the program controls to the time displayed, as well as clearing any memory failure or power interrupt indication. It should be noted, that a programmed defrost initiate will not be honored while in this mode.

With the mode selector switch S1 turned to the Set Defrost Start Time mode position, the displayed time reference will assume a 15 minute past present hour digit display with respect to the time base of the time keeping logic of timer unit 20. The status indicators 22 will indicate those outputs which were programmed on/off prior to entry into the Set Defrost Start Time mode. Pressing the advance pushbutton switch S2 will cause the program indicators 23, starting from the No. 1 indicator, and associated memory to be sequentially activated/addressed. Pressing the enter switch S3 with any program indicator selectively actuated will place into memory the time slot being displayed by display 24 at which the corresponding defrost control output is to be turned on, and erases any previously programmed defrost initiate for this time slot. Upon completion of this data entry, the time display will automatically increment to the next programmable time slot and the program indicators 23 will again indicate what if any output is programmed to initiate defrost at this time (initiate) slot. It being recognized that a programmable defrost initiate time slot is defined as a discrete 15 minute period within an hour segment/period of the time reference. Pressing the enter switch S3 without making any modification will make no modification to the program but merely set the time display to the next programmable time slot.

With the mode selector switch S2 being turned to the Set Defrost Duration Time mode position, the program indicators 23 will be blanked momentarily and program indicator number 1 will be energized to indicate program modification access. And time display 24 is actuated to present the program defrost duration in minutes. Pressing the advance button S2 will increment the displayed duration and if held will ripple advance the display at a rate of 4 minutes per second. The programmable range allowed for the duration is between 5 minutes and 180 minutes. Therefore, the decimal is blanked out with defrost duration programming so as to remove any confusion element as to the units of measurement being displayed, i.e., minutes, on the time reference display 24. Depressing the enter button S3 will enter into the control memory that duration which is displayed for the indicated output, for example, output number K1, and automatically increment the output program/indicators 23 to the next successive output. Pressing the center button S3 without any modification to the programmed duration will merely increment the program indicators 23 and, therefore, the addressed program to the next successive output control without modification to that output previously interrogated.

It should now be recognized that only one output/refrigerating unit may be programmed to initiate a time defrost cycle during any given (15 minute) time slot. However, previously initiated defrost cycles may be in progress during the defrost initiate of other refrigeration units. Thus, a plurality of defrost output signals and, therefore, refrigeration units, may be concurrently in a defrost cycle.

In any selector switch S1 mode position, an output that is already in a defrost cycle will remain so, unless manual override is exercised, under its normal time out control. However, the occurrence of a program initiate defrost cycle will only be honored if during the programmed occurrence the unit was in a Normal Operation mode, a Manual Override mode, or a Program Review mode, i.e., the system 20 was not in a program modification mode prior to entry into the Manual Override and Program Review modes. Also, at all times the control system 20 will respond to an external termination signal for any output that may at that time be in a defrost status.

The control system 20 will not retroactively respond to program events missed while the control unit 20 was in a program modification mode, but will follow future programmed events scheduled at a time following return of the control unit 20 to its Normal Operation mode.

A further feature which may be provided is a memory clear pushbutton switch S4. Pressing this button will erase all memory and produce a memory failure indication. This feature may be utilized to clear the system's memory for complete reprogramming necessitated, for example, where there was a prolonged power shortage and the integrity of the previously programmed defrost instructions is in question.

CIRCUIT DESCRIPTION

The overall operation and general organization of the preferred embodiment of the present invention is illustrated by the block diagram depicted in FIG. 2.

The preferred embodiment of the defrost control system 20 basically consists of: a central processing unit (CPU) or microprocessor device I, a control output and display device II, a programming input section III, a termination monitor IV, a data memory section V, a power supply VI, a line frequency monitor VII and a power sensing circuit VIII.

The operation of the system is under the control of the central processing unit (CPU) I which executes preprogrammed (loaded) instructions stored, for example, in memory unit V. The CPU I is connected to the functional blocks via command input and output (I/O) data buses. The defrost control system 20 transmits defrost control signals/circuit paths via data bus 26. And receives defrost status information from the refrigeration units, for example, IX and X, via data bus 27.

The CPU I is coupled to the control output and display unit II via data bus 28, terminator monitor unit IV via data bus 29, programming input unit III via data bus 30, line frequency monitor VII via lead 31 and, to the data memory section V via data buses 32 and 33. The power sensing circuit VIII and the power supply VI are both connected to the respective functional blocks noted above via connecting leads.

Figure 3:
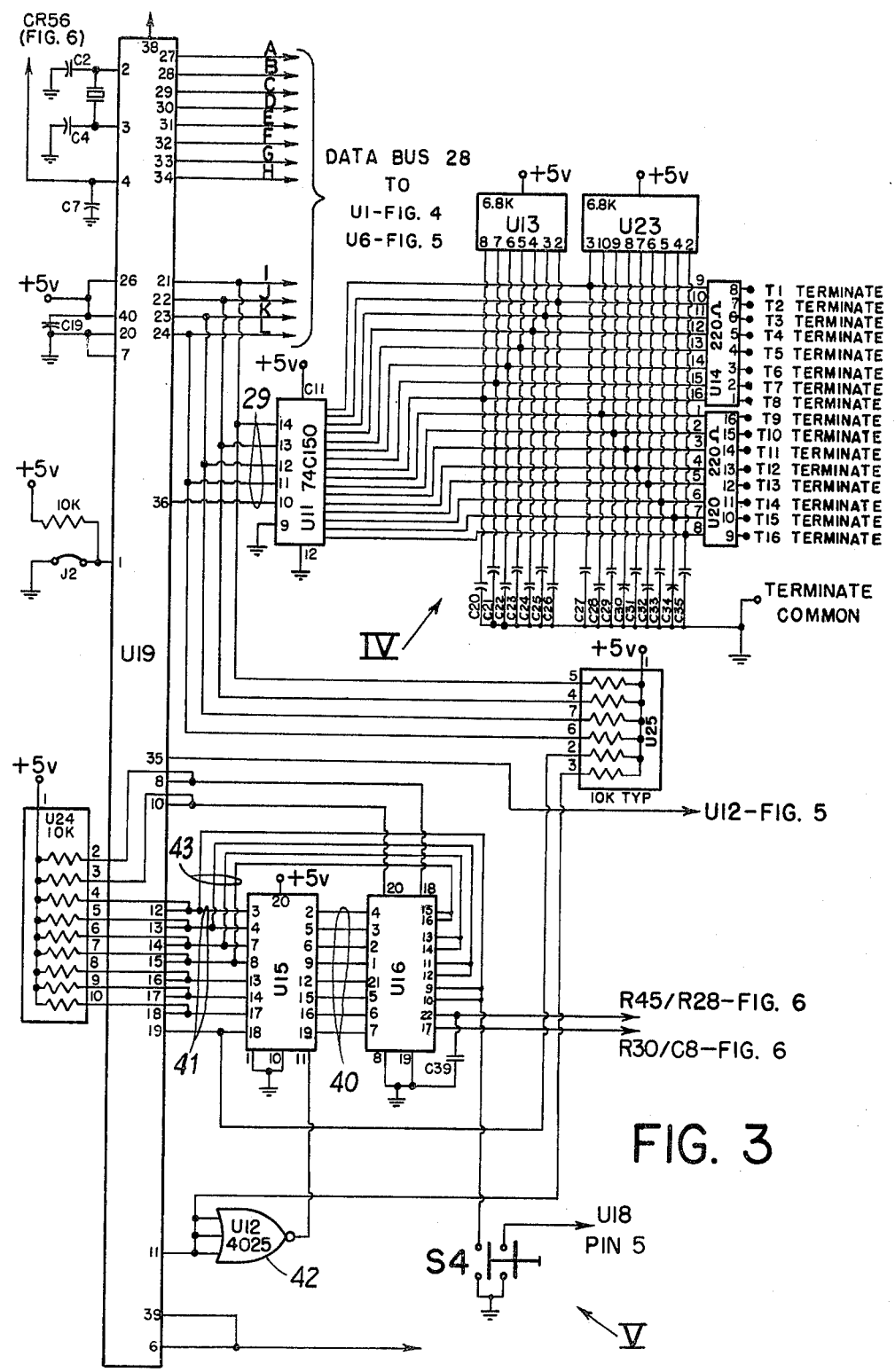
FIG. 3 is a circuit diagram of the central processing unit, memory and input monitoring logic.

With reference now to FIGS. 2 and 3, the CPU I basically comprises an 8-bit microcomputer or microprocessor U19 such as an 8048 Intel circuit chip having a mask programmed ROM, and which functions as the master controller for the system 20. Attached to the microprocessor U19 is a 3.579545 MHz Y1, whose function is to provide a stable frequency reference base for the microprocessor's U19 internal clocking oscillator. The two twenty-two Pfd capacitors C2 and C4, connected to this crystal, provide a phase shifting effect necessary for proper oscillator operation. The jumper J2 connected to the microprocessor U19 provides a means for controlling the microprocessor U19 operation for either a 50 Hertz or 60 Hertz line frequency. With the jumper J2 in the circuit, the system 20 operation is enabled for a 60 Hertz input line current to power supply VI. With the jumper J2 removed, the system is enabled for a 50 Hertz line current source. The resistant network U24 is used to pullup specific I/O lines to the microprocessor U19 in order to both improve the rise time of signals presented thereof, as well as to improve the voltage level assumed by these lines when supplied a logic "1" level.

With reference to FIGS. 2-5, the control output and display unit II will now be described in more detail.

As noted above, CPU I control data is time-division multiplexed into this circuit configuration via data bus 28. Data bus 28 comprises 12 outputs from the microprocessor U19, eight of which A-H are connected to both the Octal bus driver and Octal "D" flip-flop circuits U6 and U1. The data transmitted via data bus 28 controls the state of the defrost output signals/relays are at, and which segments of the digits in the time display 24 are to be activated and which program indicators are to be energized. Circuit leads I-L from pins 21-24, respectively, of microprocessor U19 supply a binary coded signal to the BCD-to-Decimal decoder U9 which may comprise a 4028B circuit chip from RCA. This decoder or demultiplexer U9 is used to provide a 1 of 8 selective strobe to correlate data being simultaneously provided on lines A-H originating from pins 27-34, respectively, of microprocessor U19. Decoder U9 provides a 1of-8 selective strobe, via data bus 34, to the selector switch S1 and to a 6-Digit MOS-to-LED cathode driver U10, such as 75492 circuit chip by Texas Instruments.

The first four outputs of the MOS-to-LED drive circuit U10 are connected to the time reference display 24. The display 24 is, for example, a 4-digit LED numeric array, such as the NSA1541A by National Semiconductor. Each digit of this display 24 is connected as a common cathode, 7 segment array, and having a decimal point. The four strobed lines 50 from pins 1, 2, 6 and 7 of the MOS-to-LED driver U10 serve to selectively constrain which digit of the display 24 is activated by coincidence biasing with the information being presented on the 8 input lines via data bus 35, of the display. The other two strobe lines 36 and 37 from the output of the driver circuit U10 functions as the cathode drive to the two banks of program (LED) indicators 23. Each bank of program indicators comprise 8 discrete LED's CR18-25, CR26-33.

A resistor network U8, containing 8 discrete resistors, functions as a current limitor to the 8 respective lines sourcing the individual LED's of both banks of program indicators 23, as well as functioning as a current limitor to the respective common segments of the 4 digits of the time reference display 24.

Figure 4:
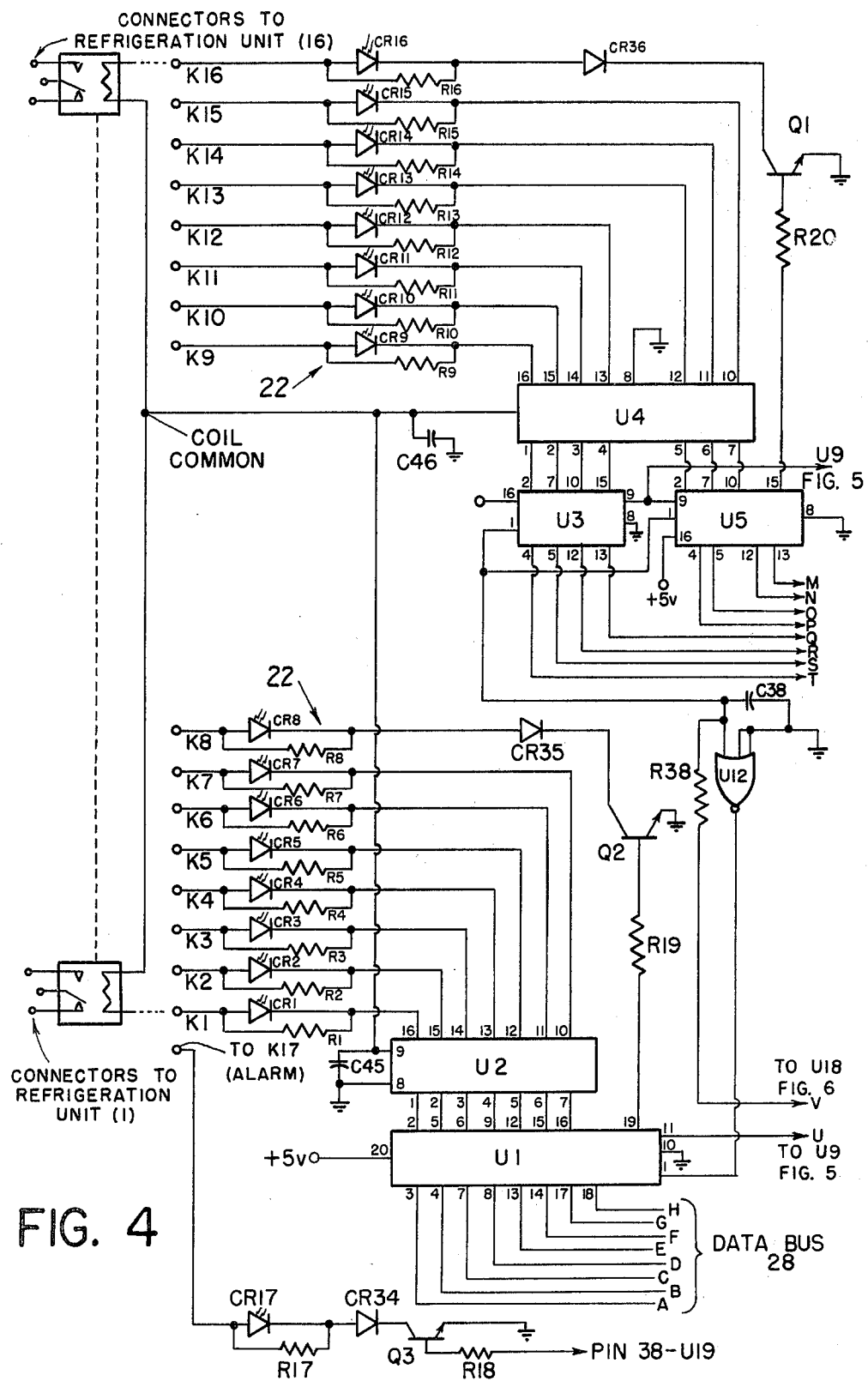
FIGS. 4 and 5 are circuit diagrams showing the defrost program/status control signals to the display panel and outputs for controlling the defrost cycles of the refrigeration units, and the program mode selector switch.
Figure 5:
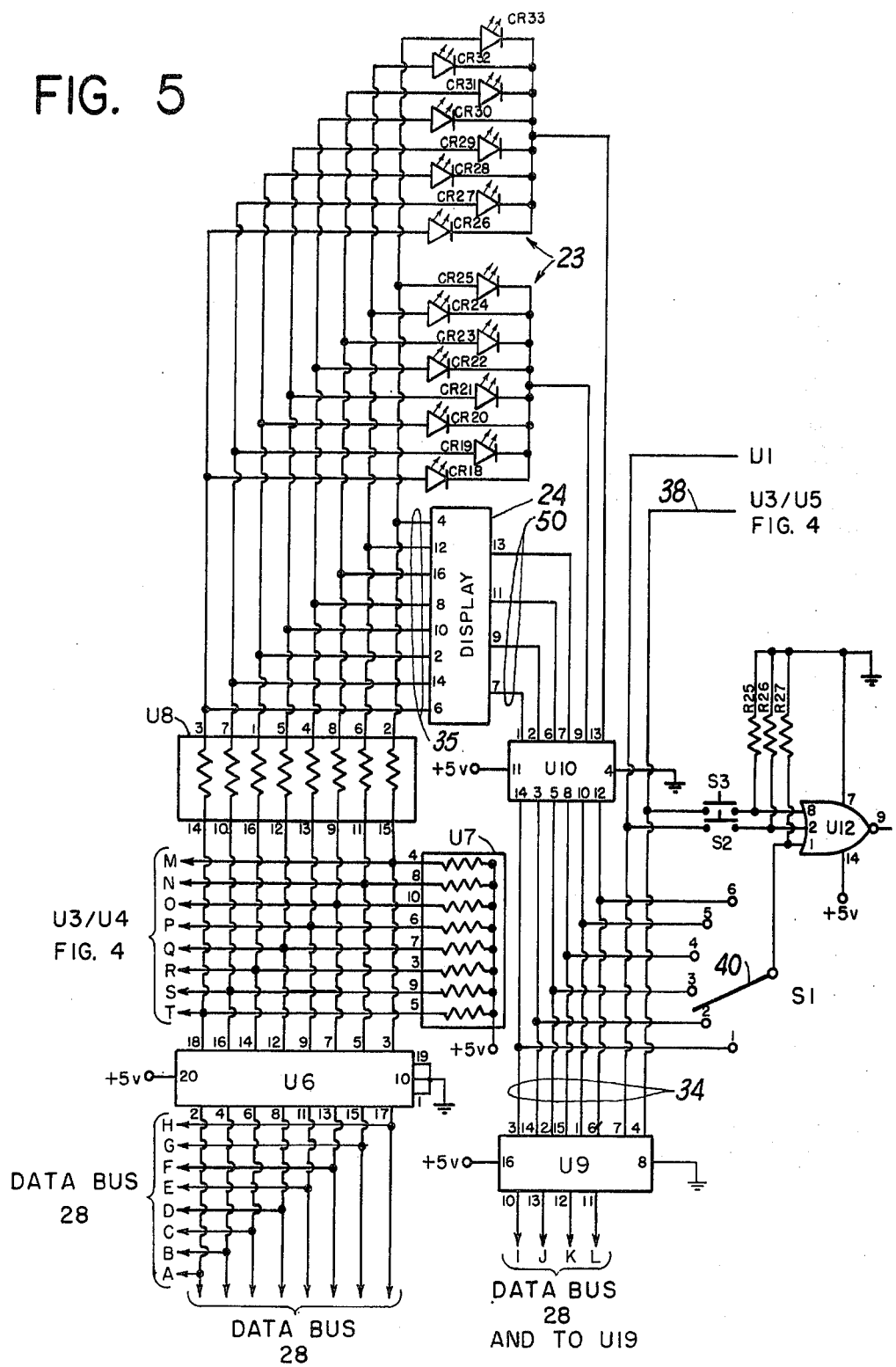

Sourcing resistor network U8 is an octal bus driver U6 such as a 76LS244 by Texas Instruments. The inputs of the Octal bus driver U6 are connected, via data bus 28, to respective outputs of microprocessor U19. The octal bus driver U6 functions as a current booster for the signals from the microprocessor U19 to drive the display 24 and program (LED) indicators 23. The outputs from the octal bus driver U6 are individually connected to a pull-up resistor within resistor network U7 so as to improve the voltage level at the inputs to the two Quad "D" flip-flop networks U3 and U5 (FIG. 4). The two Quad "D" flip-flop networks U3 and U5 function to latch this information for the purpose of controlling 8 of the 16 output defrost control signals outputs K9-K16, for example, to respective relays hereinafter discussed. These two flip-flop devices U3 and U5 have a common latch strobe, via lead 38, originating from multiplexer U9 (FIG. 5).

Output pins 2, 7, 10 and 15 of flip-flop network U3 and output pins 2, 7, and 10 of flip-flop network U5 are connected to a highvoltage, high-current NPN Darlington transistor array U4, such as an MC1413 by Motorola. The Darlington transistor U4 functions as a 7 channel driver for the first 7 of the 8 outputs K9-K16. The last output pin 15 of flip-flop circuit U5 is fed into the base of an NPN transistor Q1 via a current limiting resistor R20. Transistor Q1 has its collector connected, via diode CR36, and status indicator number (CR)16 to output K16. Transistor Q1 serves as the driver for output K16. When activated, these drivers selectively will provide a current path to ground, i.e., the relay coil common 38, by which their respective outputs may be energized.

A (LED) defrost/status indicator CR9-CR16 is connected in series between an output driver and a defrost signal/relay drive output K9-K16, respectively. Each defrost/status indicator CR9-CR16 is, thereby, selectively energized to luminance whenever drive signal is provided to a defrost/signal (relay) output K9-K16, respectively.

A similar circuit configuration as described above is utilized to provide defrost signals on output K1-K8. However, in this circuit configuration an Octal "D" flip-flop network U1, in response to control signals from microprocessor U19, via data bus 28, is used to selectively control each of 8 drivers connected in series with a defrost/status indicator CR1-CR8 and outputs K1-K8, respectively. Driver output circuit U2 comprises a Darlington transistor array containing 7 output drivers such as an MC1413 by Motorola. The driver to output K8 is formed by transistor Q2 in series with diode CR35.

The alarm indicator 25 is formed by a LED CR17 and is energized to luminance by driver Q3 in response to an alarm signal from microprocessor U19. The alarm signal is activated if the unit has suffered a user program memory loss resulting for example, from a power loss. The alarm output K17 may be connected to, for example, a bell device.

The latching input or strobe to the Octal "D" flip-flop network U1 is connected to output pin 7 of binary coder U19 (FIG. 5).

Figure 6:
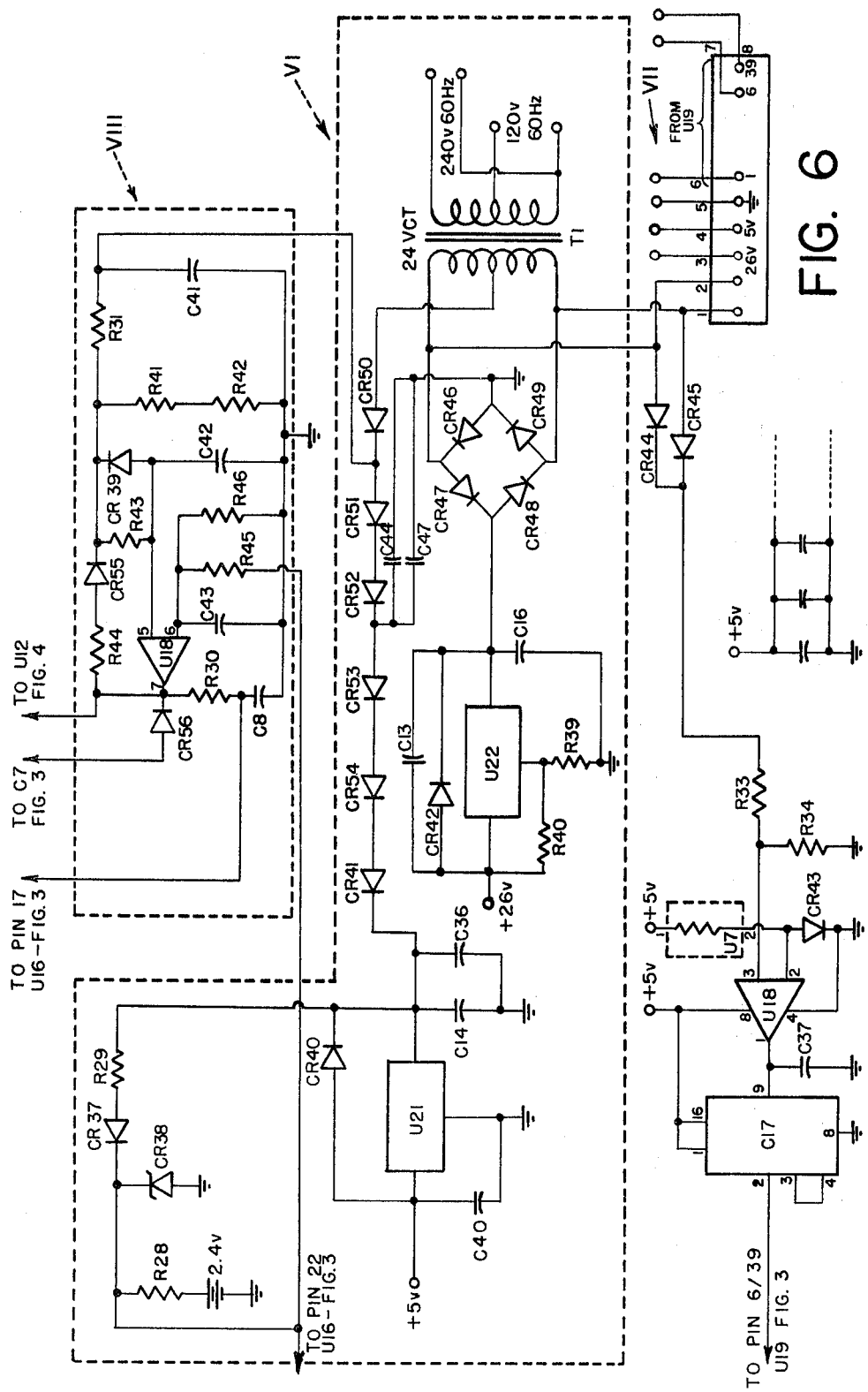
FIG. 6 is a circuit diagram of the power supply, the power sensing circuitry and the line frequency monitor unit.

A clear input (pin 1) of the flip-flop network U1 is connected to the output of inverter U12. The clear inputs to inverter U12 and flip-flop networks U3 and U5 are connected, via a release delay RC network R38, C38, to the power sensing circuit VIII (FIG. 6).

With reference to FIG. 5, the mode selector switch S1, advance switch S2, and the enter switch S3 will now be described. The mode selector switch S1 basically comprises a 6 position rotary switch, with each terminal position being connected to an output of the binary coder or multiplexer U9. The wiper terminal 40 of switch S1 is connected to one input of a three input NOR gate U12. The second input of NOR gate U12 is connected in series with the advance switch S2 to an output of the binary coder U9. The third input of NOR gate U12 is connected in series with the enter switch S3 to another output of the binary coder U9. NOR gate U12 may comprise any conventional NOR gate circuit such as a 4025B from RCA. NOR gate U12 has its inputs weakly biased low by three resistors R25-27 connected between ground and each input. The mode selector switch S1, the advance switch S2 and the enter switch S3 are selectively identified by the sequential strobing of each respective output of multiplexer U9. The output of NOR gate U12 is connected to microprocessor U19 for correlating the switch and associated strobe to recognize/identify each switches S1, S2, and S3 physical position.

With reference to FIG. 3, the termination monitor section IV basically consists of a terminal network having sixteen individual terminals T1-T16 and a terminal common. Each terminal T1-T16 and the terminal common is coupled to a respective refrigerator unit. The other end of each terminal T1-T16 is connected via a respective resistor to an output of multiplexer U11. The 16 discrete termination resistors are contained in resistor network U14 and U15, each of which contains eight such termination resistors. The termination resistors serve as a mild signal attenuator for the respective input T1-T16. The remote ends of each of the termination resistors from their respective terminal T1-T16 end connections, are connected to a capacitor C20-C35, respectively, which provides high frequency filtering for the input signals. Each remote end of the termination resistors are also biased high by connection to, for example, a 5 VDC potential via a respective (6.8K ohm) biasing resistor. The biasing resistors are contained in resistor networks U13 and U23, each of which contains eight separate such resistors. The common junction between each remote end of a termination resistor, a biasing resistor and a respective capacitor C20-C35 is connected to one of the 16 inpus of multiplexer U11.

The multiplexer U11 via data bus 29 is coupled to strobing information from microprocessor U19. This information enables the multiplexer U11 to select the monitored (data) input signals on terminals T1-T16 for being multiplexed and transmitted to microprocessor U19. The microprocessor U19, in turn, processes this multiplexed information for executing the termination functions.

The data memory section V basically comprises a 1024 bit static CMOS RAM U16 with a 256×4 bit arrangement, such as a MWS5101 circuit chip by RCA. The RAM U16 provides the necessary memory capacity to retain the information required by the system 20. This information includes the user's defrost schedule program, each output programmed duration, the programmed time reference, each activated output's remaining defrost time and all other similarly pertinent information. The eight address input lines 40 are connected/sourced by a respective output of an Octal "D" flip-flop network U15, such as a 74C374 by National Semiconductor. The output of the discrete flip-flops are used to latch a respective one of the eight address input signals, via leads 41, which are momentarily presented on the latch input of the flip-flop network U15. The address designator signals are validated by a strobe signal from microprocessor U19 via NOR gate 42. NOR gate 42 may be a 4025 circuit chip from RCA. NOR gate 42 provides the necessary inversion of the strobe signals to latch the appropriate information in the flip-flop network U15.

The address signals presented on leads 43 in conjunction with strobe signals from microprocessor U19 (pins 8 and 10), are coupled to RAM U16 to control the direction of data transfer. A strobe signal on pin 8 will cause data transfer from RAM U16 to microprocessor U19. Conversely, if a strobe signal is provided on pin 10, data transfer is enabled from microprocessor U19 to RAM U16.

The memory clear (pushbutton) switch S4, as noted above, is connected to RAM U16 and to the power sensing circuit for providing a user memory clear function. This is effected by shorting to ground the RAM U16 and providing a false power loss indication to the power sensing circuit VIII which energizes the alarm indicator 25.

With reference to FIG. 6, the power supply VI, line frequency monitor VII, and power sensing unit VIII will now be described.

For ease of understanding the power supply can be understood as comprising three separate supplies: (1) a 26 VDC supply used for powering the output signals/relay coils, (2) the battery supported RAM supply and (3) the 5 VDC logic supply used for the balance of the circuitry.

The 26 VDC supply is provided by, for example, an LM317 by National Semiconductor, which is designated as U22. This device is an adjustable (1.2 V-37 V) positive voltage regulator. Adjustment of the regulator, so as to fix the output voltage at 26 VDC, is accomplished by the program resistor R40 and the output set resistor R39 connected to the adjustment input of the regulator (pin 1). Acting as the source supply to the regulator is a full-wave bridge rectifier 45 connect to the 24 VAC transformer secondary 46. The bridge rectifier 45 is made up of four diodes CR46-CR49, such as IN4003 type diodes. The bridge rectifier 45 output has one side referenced to circuit ground and the other providing the pulsed DC voltage for the 26 VDC supply. This output is filtered by a capacitor C16 to reduce the ripple level of the supply line to the regulator.

The five VDC logic supply is provided by a 7805 circuit chip U21 from National Semiconductor. This device U21 is a fixed positive 5 volt regulator. Immediately connected to its output (pin 3) is a bypass capacitor C40 for improved transient response. The regulator is sourced by way of a chain of 6 diodes CR40, CR41, CR50-CR54, whose ultimate source is the center tap of the 24 VAC transformer secondary 46. The purpose of this diode chain is to provide a partial voltage drop in the line supplying the regulator so the regulator will not be subjected to as great an input-output differential voltage and as a result not have to dissipate quite as much power in regulating its output to 5 VDC. Midway down this diode chain is a capacitor pair C44 and C47. These capacitors serve as supply line filter and storage devices allowing for a delay in the loss of supply when power is removed from the unit. An additional capacitor C14 is located at the end of the diode chain to provide additional filtering and storage. Capacitor C36 is provided for input stabilizing.

Both the 26 VDC and the 5 VDC regulators have a diode CR42 and CR40, respectively, placed across their output and input terminals. These feedback diodes, which are normally reverse-biased, are provided in each case so as not to allow the input to the regulator to drop more than one diode drop (approximately 0.7 volts) below the output. This is to protect the regulators series-pass transistor (internal) from damage.

The RAM supply has its input commoned to the input of the 5 VDC regulator. This line is first presented a current limiting resistor R29. In line with this resistor R29 is an isolating diode CR37. This diode is provided so that, when power is removed from the unit, the battery in this portion of the circuit is not drained trying to supply more then it is regulated for. At the cathode end of this isolating diode is connected a Zener diode CR38. This diode CR38 is used so as not to allow the voltage, from this point on, to exceed 5.1 volts. Also connected at this point is the auxiliary battery supply which consists of a 2.4 volt battery in series with a current limiting resistor R28. Resistor's R28 primary function is to limit the charging current to the battery when the unit is under power. The output of this supply goes to the power sensing circuit VIII and the data memory circuit V.

The line frequency monitor VII provides the system 20 with the time reference signal on display 24 by monitoring the incoming AC line frequency. A voltage comparator U18 such as an LM358 by National Semiconductor provides the logic level output indicating the amplitude relationship between the referenced input (pin 2) and the monitoring input (pin 3). The reference input is biased to approximately 0.7 volts (the forward voltage drop across diode CR43) by a resistor. The monitoring input has supplied to it a full-wave rectified pulsated DC signal at twice the line frequency. This is done by means of the diode pair CR44 and CR45, in conjunction with bridge diodes CR46 and CR49. The voltage level of this signal is reduced by means of the voltage divider arrangement of R33 and R34. The resulting output of the comparator U18 is a logic level pulse train with a frequency double that of the supply line. A high frequency filter C37 is connected to this output prior to its input to a flip-flop network U17 so arranged as to halve the frequency and output a square wave equal to the line frequency. This signal is then fed to the microprocessor U19 for its timing reference.

The power sensing circuit VIII detects whether the incoming supply potential is sufficient for providing stable power supply output and terminates the operation of the system 20 when incoming potentials drop below a predetermined level.

The power sensing circuit VIII basically comprises a voltage comparator U18 with hysteresis such as an LM358 by National Semiconductor. The reference voltage on pin 6 of comparator U18 results from a voltage divider network R45 and R46 which is high frequency filtered by capacitor C43 and sourced from the RAM supply to provide a continuous positive reference. The monitoring input centers on an RC network R43 and R42 with a shunting diode CR39 paralleling the resistor in the discharge path. The primary source to this RC network comes from the transformer center tap. This signal is noise filtered via capacitor C41 and voltage reduced via voltage divider arrangement of resistors R31, R41 and R42. The resulting signal being supplied to the RC network is a DC voltage level with an AC ripple voltage at twice the line frequency superimposed upon it.

Positive feedback from the comparator U18 acts as a supplemental source to this RC network, when and only if the comparator U18 has been turned on. This additional feedback is to: (1) compensate for any minute (residual) ripple remaining in the RC input so as to prevent oscillation of the comparator U18 and, (2) provide a desired hysteresis so that once adequate potential is detected the unit will withstand minor fluctuations or brown-outs without shut-downs. This positive feedback is provided by resistor R44 and capacitor CR55. The values of all devices in this circuit are so chosen to mandate the comparator to turn on at 85% rated input line voltage and to provide the hysteresis, once turned on, to 77% before shut-down will occur.

The output of the power sensing circuit VIII is connected to the microprocessor's U19 reset input, the RAM disable input and the clear inputs of the output latch network.

In one embodiment of the invention (FIG. 4), the output defrost control signals from outputs K1-K16 are each connected to one end of a coil of a relay R1-R16, respectively. The other end of the relay coils R1-R16 are connected to the coil common terminal. In this manner, a relay circuit path is selectively coupled to the defrost control element of the respective refrigeration units for controlling the defrost cycle thereof.

I claim:

1. A defrost control apparatus for one or more refrigeration units having associated defrosting equipment comprising:

input means for selectively producing corresponding to each of said refrigeration units programming data, a user defrost initiate signal, a user defrost terminate signal, a program defrost initiate time review signal, and a program defrost duration review signal;

memory means for storing said programming data;

processing means responsive to stored defrost initiate time and duration data for providing a program constrained defrost control output corresponding to each of said refrigeration units, and responsive to a user initiate defrost signal corresponding to a selected refrigeration unit for providing an initiate defrost control output thereto and for a predetermined period, and responsive to a user terminate defrost signal corresponding to a selected refrigeration unit to provide a terminate defrost output thereto, and responsive to a program defrost initiate time review signal to interrogate said memory means and provide data signal representative to the stored defrost initiate time corresponding to a selective refrigeration unit, and responsive to a program defrost duration review signal to interrogate the memory means and provide data signals representative of the stored defrost duration time for a selected refrigeration unit;

display means responsive to said program constrained defrost control outputs for providing indicia indicative of the defrost status thereof, and to provide indicia indicative of a manually initiated defrost cycle in response to said user initiated output, and to provide indicia indicative of a manually terminated defrost cycle in response to said user terminate defrost output, and to provide indicia indicative of the stored defrost initiate time in response to said data signals representative of the stored defrost initiate time for a selected refrigeration unit, and to provide indicia indicative of the stored defrost duration time in response to said data signals representative of the stored defrost duration time for a selected refrigeration unit;

said input means comprising a mode selector switch, and a data advance/set switch, and a data enter switch, said mode selector switch having a program review mode function position and said data advance/set switch being actuatable with said mode selector switch in program review mode function position to constrain said processing means to interrogate the stored defrost initiate time data and to actuate a display indicia indicative of the programmed defrost initiate relative time for a display indentified defrost control output; and the actuation of the program review mode function is permitted while and without interruption to the normal sequencing and timing of the defrost cycle of the defrost control outputs as constrained by the stored defrost initiate and duration time data.

2. Apparatus as in claim 1, wherein:

the display means includes a digital time reference display for presenting the elapsed time of a predetermined period.

3. Apparatus as in claim 1, wherein:

the mode selector switch has a normal operation mode function position for constraining said processing means to selectively actuate a defrost control output in response to the stored defrost initiate time and duration data.

4. Apparatus as in claim 1, wherein:

the mode selector switch has a manual override mode function position;

the data advance/set switch is actuatable with said mode selector switch in the manual override mode function position to selectively constrain said processing means to interrogate the defrost control outputs status and actuate a display indicia indicative of the defrost status of the selectively interrogated defrost control output; and the data enter switch is actuatable with said mode selector switch in the manual override mode function position to constrain said processing means to change the then current defrost state of the interrogated defrost control output from an "on" state to an "off" state or from the "off" state to an "on" state selectively.

5. Apparatus as in claim 1, wherein:

the mode selector switch has a set clock time of day mode function position;

the advance/set switch is actuatable with said mode selector switch in the set clock time of day mode function position to constrain said processing means to display an advancing time display to a desired displayed time reference; and the data enter switch is actuatable to contrain said processing means to effect a setting of the time display to the desired time reference.

6. Apparatus as in claim 1, wherein:

the mode selector switch has a set defrost start time function position;

the data advance/set switch is actuatable with said mode selector switch in the set defrost start time function position to constrain the processing means to address the memory location for a selected defrost control output; and the data enter switch is actuatable to constrain the processing means to associate a stored selected defrost initiate time data with a selected defrost control output.

7. Apparatus as in claim 1, wherein:

the mode selector switch has a set defrost duration time mode function position;

the advance/set switch is actuatable with said mode selector switch in the set defrost duration time function position to constrain the processing means to cause the displaying means to display indicia indicative of a selected defrost time duration; and the data enter switch is actuatable to constrain the processing means to store the displayed defrost time duration for a selected defrost control output.

8. Apparatus as in claim 1, wherein:

the display means includes a front panel means having a first set of indicators containing a plurality of discrete indicators each corresponding to a defrost control output for indicating the defrost status thereof, and having a second set of indicators containing a plurality of discrete indicators each corresponding to a defrost control output interrogatable memory location data, and having a digital time reference display, and having a six position rotary mode selector switch, and having a pushbutton advance/set switch, and having a pushbutton data enter switch, and having a program loss indicator, and having a memory clear pushbutton switch.

* * * * *